(12) United States Patent
Kotoyori

(10) Patent No.: US 11,508,150 B2
(45) Date of Patent: Nov. 22, 2022

(54) IMAGE PROCESSING APPARATUS AND METHOD OF CONTROLLING THE SAME

(71) Applicant: CANON KABUSHIKI KAISHA, Tokyo (JP)

(72) Inventor: Takuya Kotoyori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 252 days.

(21) Appl. No.: 16/906,355

(22) Filed: Jun. 19, 2020

(65) Prior Publication Data
US 2020/0401805 A1    Dec. 24, 2020

(30) Foreign Application Priority Data

Jun. 24, 2019    (JP) .............................. JP2019-116628

(51) Int. Cl.
*G06K 9/00*    (2022.01)
*G06V 20/20*    (2022.01)
(Continued)

(52) U.S. Cl.
CPC .............. *G06V 20/20* (2022.01); *G06T 7/50* (2017.01); *G06T 7/70* (2017.01); *G06T 7/90* (2017.01);
(Continued)

(58) Field of Classification Search
CPC ........ G06V 20/20; G06V 10/56; G06V 20/41; G06T 7/50; G06T 7/70; G06T 7/90;
(Continued)

(56) References Cited

U.S. PATENT DOCUMENTS 5,900,849 A    5/1999    Gallery
7,808,450 B2    10/2010    Wanda
(Continued)

FOREIGN PATENT DOCUMENTS

JP    4642538 B2    3/2011
JP    2014170330 A    9/2014
(Continued)

OTHER PUBLICATIONS

Engel "LSD-SLAM: Large-Scale Direct Monocular SLAM." European Conference on Computer Vision (ECCV). 2014: 1-16. Cited in the specification.

*Primary Examiner* — Duy M Dang
(74) *Attorney, Agent, or Firm* — Rossi, Kimms & McDowell LLP

(57) ABSTRACT

In order to make it possible for the user to perceive the possibility of a collision with an object in the real world, an image processing apparatus comprises: a location estimation unit configured to, based on a video obtained by an image capturing unit for capturing a physical space, estimating a self-location of the image capturing unit in the physical space; a recognition unit configured to recognize a physical object existing within a certain distance from the self-location based on the video; an area decision unit configured to decide a predetermined area in the physical space in relation to the video; and a determination unit configured to determine whether or not a warning is given in accordance with whether or not a physical object recognized by the recognition unit is included in the predetermined area.

18 Claims, 15 Drawing Sheets

(51) Int. Cl.
  *G06T 7/90* (2017.01)
  *G06T 7/70* (2017.01)
  *G06T 7/50* (2017.01)
  *G06V 10/56* (2022.01)
  *G06V 20/40* (2022.01)
(52) U.S. Cl.
  CPC .............. *G06V 10/56* (2022.01); *G06V 20/41* (2022.01); *G06T 2207/10016* (2013.01); *G06T 2207/10024* (2013.01); *G06T 2207/10028* (2013.01)
(58) Field of Classification Search
  CPC ............. G06T 7/73; G06T 2207/10016; G06T 2207/10024; G06T 2207/10028; G06T 2207/30244
  See application file for complete search history.

(56) References Cited

U.S. PATENT DOCUMENTS

| | | | |
|---|---|---|---|
| 2006/0273984 A1* | 12/2006 | Wanda | A63F 13/213 345/7 |
| 2017/0249822 A1 | 8/2017 | Kotoyori | |
| 2019/0026919 A1 | 1/2019 | Aratani | |

FOREIGN PATENT DOCUMENTS

| | | |
|---|---|---|
| JP | 2017129567 A | 7/2017 |
| JP | 2017156887 A | 9/2017 |

* cited by examiner

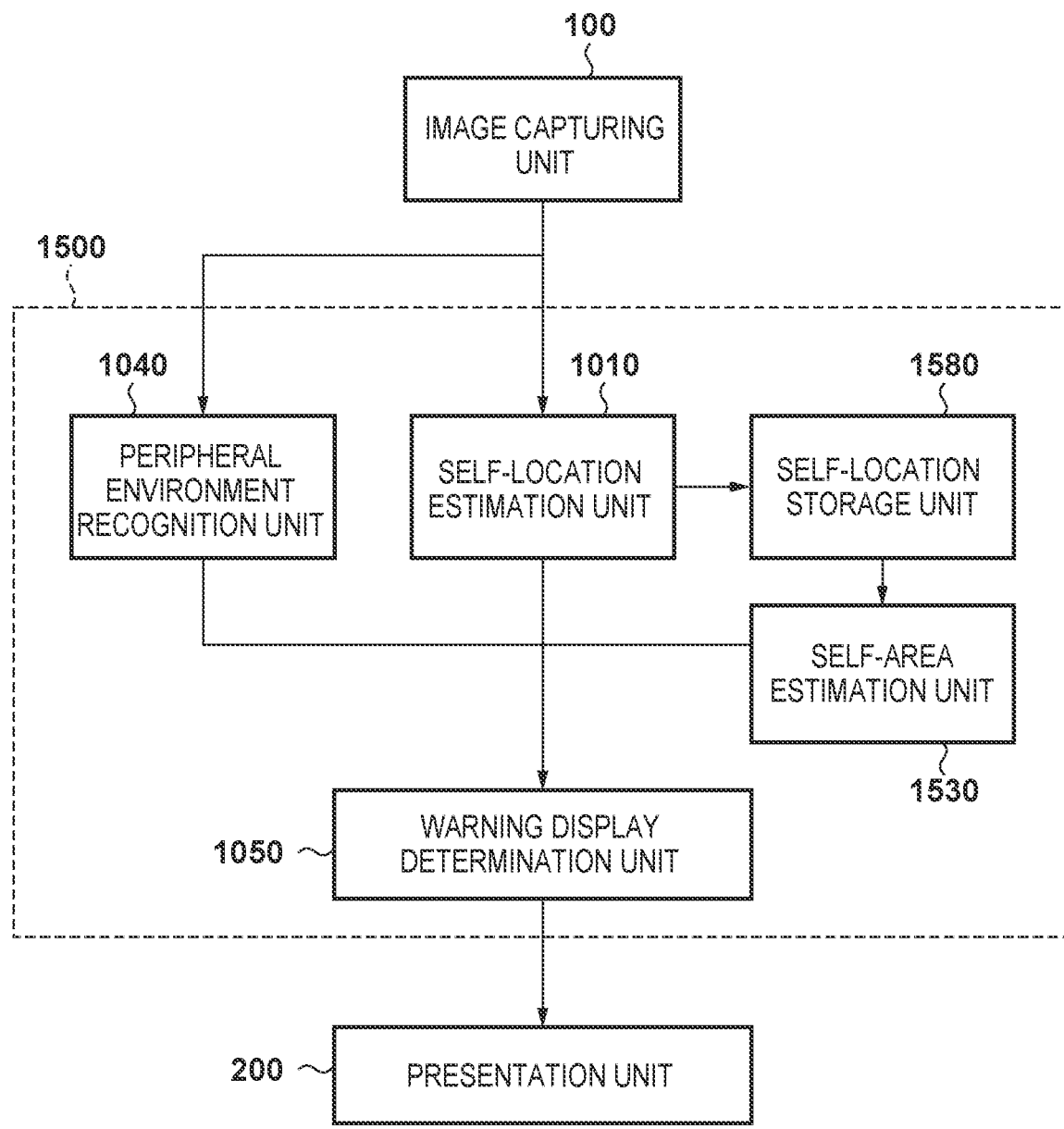

IMAGE PROCESSING APPARATUS AND METHOD OF CONTROLLING THE SAME

BACKGROUND OF THE INVENTION

Field of the Invention

The present invention relates to an image processing technique in a mixed reality system.

Description of the Related Art

Mixed Reality (MR) technology and Augmented Reality (AR) technology are known as technologies for merging the real world and a virtual world in real time. As an apparatus for presenting video by MR (or AR) to users, there is a video see-through type image processing apparatus (video see-through terminal). This is an apparatus which captures the real world by a video camera, and displays on a display a composite image in real time by superimposing a virtual object on a captured image to present it to a user. For example, video see-through terminals may be tablet terminals with video cameras on the back, or video see-through type head-mounted displays (HMDs), and the like.

Further, in the display of MR, due to a limitation of the displaying area in the display apparatus and due to areas that block the video of the real world such as CG drawing areas, the field of view of the user for the real world is narrowed. Therefore, there is a higher possibility that a user who experiences the mixed reality will collide with another user or a physical object in their surroundings in some cases. Therefore, it is necessary to be able to accurately ascertain such circumstances.

Japanese Patent No. 4642538 (PTL1) discloses a technique for obtaining the distance between MD users and notifying the approach of a user when the distance becomes equal to or less than a predetermined value. U.S. Pat. No. 5,900,849 (PTL2) discloses a technique for issuing a warning and switching to a real video when the location of the HMD is outside a predetermined area. Japanese Patent Laid-Open No. 2014-170330 (PTL3) discloses a technique for measuring the external environment in real time and issuing warnings.

However, in the techniques of PTL1 and PTL2, there is a problem that objects to be warned about need to be registered in advance. Further, there is a problem that it is impossible to cope with a moving object. Further, although it is possible to cope with moving objects by the technique of PTL3, there is a problem that the hands, feet, or the like of the user himself/herself are misrecognized as an obstacle, thereby impeding the mixed reality experience.

SUMMARY OF THE INVENTION

According to one aspect of the present invention, an image processing apparatus comprising: a location estimation unit configured to, based on a video obtained by an image capturing unit for capturing a physical space, estimating a self-location of the image capturing unit in the physical space; a recognition unit configured to recognize a physical object existing within a certain distance from the self-location based on the video; an area decision unit configured to decide a predetermined area in the physical space in relation to the video; and a determination unit configured to determine whether or not a warning is given in accordance with whether or not a physical object recognized by the recognition unit is included in the predetermined area.

The present invention enables a user experiencing mixed reality to better perceive the possibility of a collision with real world objects.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is a block diagram illustrating a configuration of an information processing system according to a fourth embodiment.

DESCRIPTION OF THE EMBODIMENTS

Figure 1:
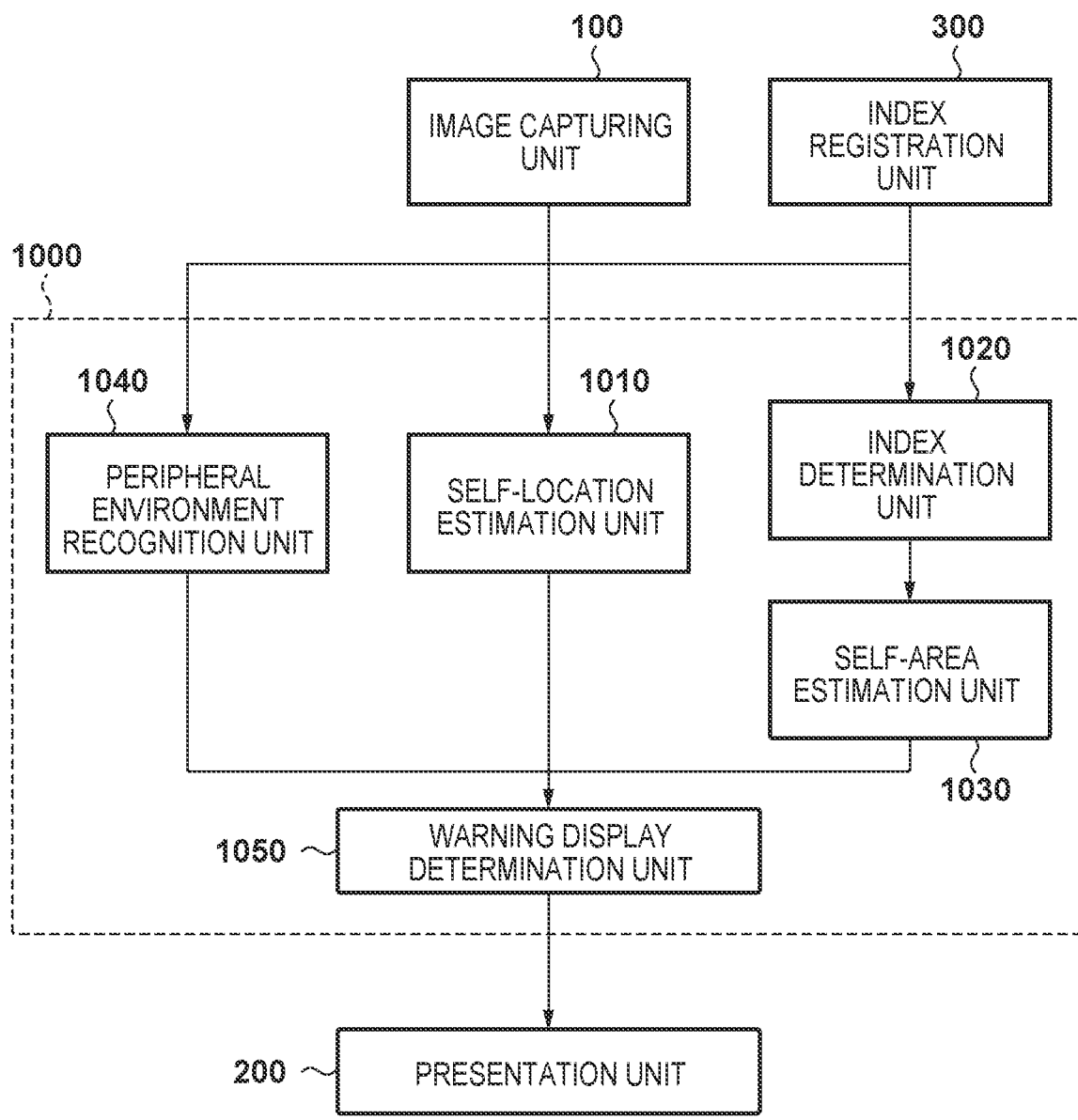
FIG. 1 is a block diagram illustrating a configuration of an information processing system according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

First Embodiment

As a first embodiment of an image processing apparatus according to the present invention, an information processing system configured as a video see-through HMD will be described below as an example. In particular, an embodiment in which a user is notified of a warning about a collision with an obstacle existing in the periphery will be described.

<System Configuration>

FIG. 1 is a block diagram illustrating a configuration of an information processing system according to a first embodiment. As described above, the information processing system is configured as a video see-through type HMD, and includes an image capturing unit 100, a presentation unit 200, an index registration unit 300, and an information processing apparatus 1000. The image capturing unit 100 is a video camera for outputting a video by imaging the physical space. The presentation unit 200 is a display unit for displaying an image (e.g., warning display) and a sound reproduction unit for reproducing sound (e.g., warning sound reproduction). Here, the image capturing unit 100 and the presentation unit 200 are mounted on the HMD, and the index registration unit 300 is assumed to be a removable external terminal. Each processing unit included in the information processing apparatus 1000 may be configured to be processed by a PC (not illustrated) outside the HMD. In this case, the HMD and the PC (not illustrated) are configured to be able to communicate with each other by wired or wireless communication.

Figure 12:
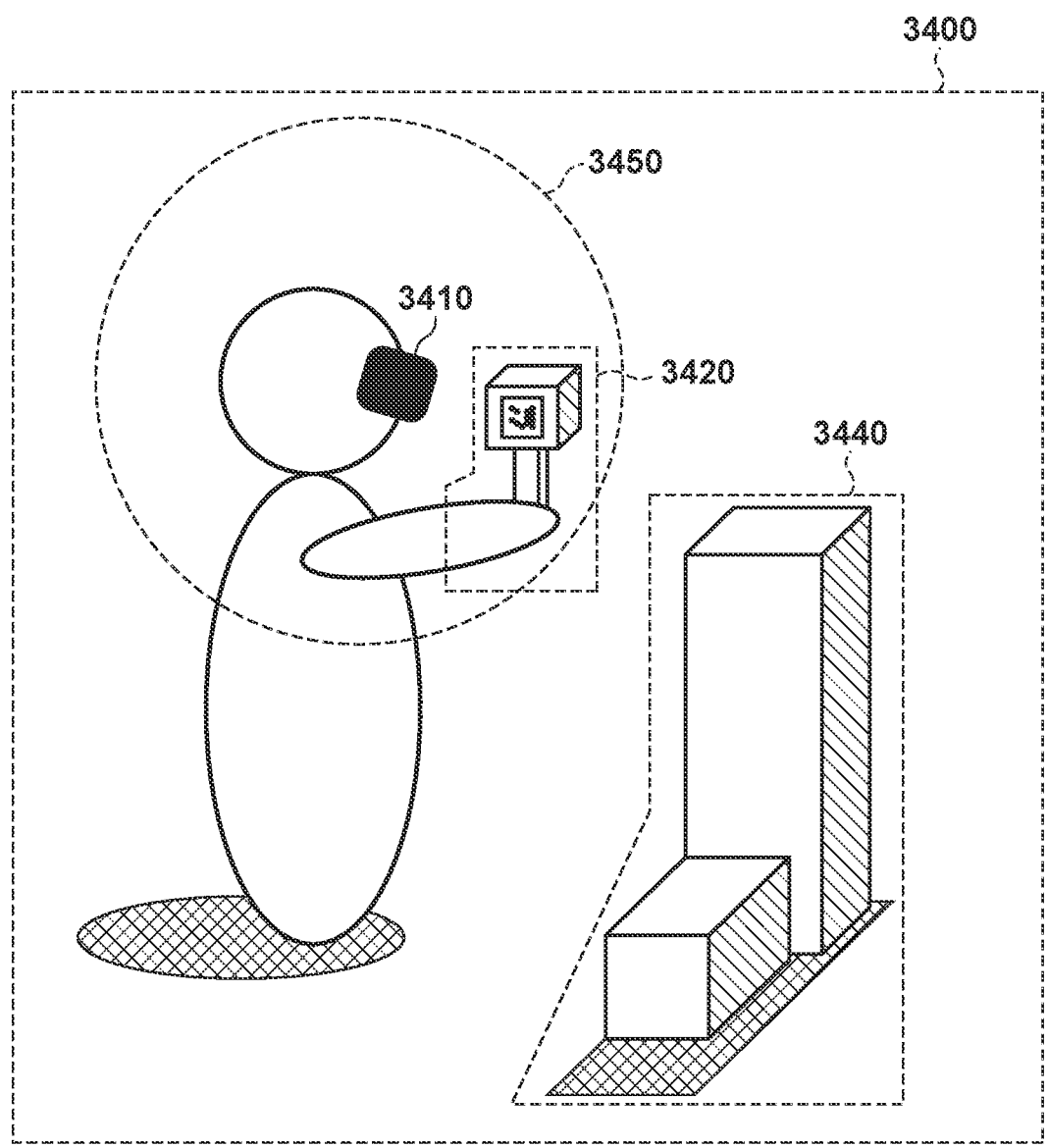
FIG. 12 is a diagram for explaining the relationship between the self-location, the self-area, and the surrounding environment.

FIG. 12 is a diagram for explaining a relationship between a self-location, a self-area, and an obstacle-area. In an MR experience environment 3400, a self-location 3410, a self-area 3420, and an obstacle-area 3440 can be defined. Note that a broken line circle 3450 indicates the range of a certain distance from the self-location 3410.

"Self-location" indicates the location of the image capturing unit 100 in the space (the viewpoint location of the user wearing the HMD). For example, the self-location is expressed by 3 parameters that represent a location in a coordinate system with a predetermined point in the MR experience environment 3400 set as the origin, and three axes orthogonal to each other defined as the X-axis, the Y-axis, and the Z-axis. In addition, three parameters representing the orientation (direction) may be added to the representation.

"Self-area" is a term that indicates the range in which a user wearing the U/HD exists (the range in which the user's body, such as their hand or arm exists). Note that an object such as a hand-held object 3420 that moves in synchronization with the movement of the user himself/herself may also be considered as a self-area in addition to the user's own hand or arm. For example, the self-area is expressed by a plurality of sets of 3 parameters that express a location in a coordinate system with a predetermined point in the MR experience environment 3400 set as the origin, and three axes orthogonal to each other defined as the X-axis, the Y-axis, and the Z-axis.

"Obstacle-area" is a term indicating an area where an obstacle object exists in the surrounding environment of the user wearing the HMD. For example, the obstacle-area is expressed by a plurality of sets of 3 parameters that express a location in a coordinate system with a given point in the MR experience environment 3400 set as the origin, and three axes orthogonal to each other defined as the X-axis, the Y-axis, and the Z-axis.

In the following description, the self-location, the self-area, and the obstacle-area will be described as being represented by the coordinate parameters in the same coordinate system. However, configuration may be such that the self-location, the self-area, and the obstacle-area are expressed in different coordinate systems, and associated by coordinate transformation.

The information processing apparatus 1000 includes a self-location estimation unit 1010, an index determination unit 1020, a self-area estimation unit 1030, a peripheral environment recognition unit 1040, and a warning display determination unit 1050. The user or operator registers an index image (e.g., a specific pattern or marker) indicating a reference location for the self-area in advance in the information processing apparatus 1000 via the index registration unit 300. The information processing apparatus 1000 detects the index image registered from the video acquired by the image capturing unit 100 and performs estimation of the self-area.

The self-location estimation unit 1010 acquires video from the image capturing unit 100, estimates the self-location, and notifies the estimation result to the warning display determination unit 1040. It should be noted that the self-location can be obtained by the estimation by SLAM (Simultaneous Localization And Mapping). In addition, estimation by tracking feature points in the video or estimation by detection of optical or magnetic sensors or known index images in the image can be used.

The index determination unit 1020 acquires a video from the image capturing unit 100, detects a given index image which is an image feature that appears in the acquired video, and notifies the self-area estimation unit 1030. Specifically, two-dimensional coordinates in the index image set in the area to be determined as the self-area of the user are acquired from the index registration unit 300. Here, any known index image may be used as long as the index image and the area in the image can be uniquely specified and the coordinates in the three-dimensional space can be obtained. For example, a rectangular index having a pattern image as described in Japanese Patent Laid-Open No. 2017-129567 can be used. It is also possible to use the technique described in the literature "LSD-SLAM: Large-Scale Direct Monocular SLAM, J. Engel, T. Schops, D. Cremers, European Conference on Computer Vision (ECCV), 2014".

The self-area estimation unit 1030 decides a predetermined area as the self-area based on the two-dimensional coordinates of the index image acquired from the index determination unit 1020, and notifies the warning display determination unit 1050 thereof. Here, various methods for deciding the area to be determined as the self-area can be used, such as deciding an area in which the index image exists, deciding an area within a certain distance from the area of the index image, deciding a fixed area defined by a certain offset from the area of the index image, and the like. In general, an area including an area of the index image is decided as the self-area.

A peripheral environment recognition unit 1040 acquires video from the image capturing unit 100, measures an object in the surrounding environment, and performs input to the warning display determination unit 1050. Here, the measurement of the object in the surrounding environment is obtained by estimating the depth from the parallax in video from a plurality of viewpoints, but it may be a value measured using any known method such as depth estimation by a depth sensor.

The warning display determination unit 1050 determines whether or not a warning display is to be performed in the presentation unit 200, and when the warning display is to be performed, notifies a warning display command to the presentation unit 200. First, it is determined whether there is an object measured by the peripheral environment recognition unit 1040 within a certain distance from the self-location acquired from the self-location estimation unit 1010. Next, the self-area is acquired from the self-area estimation unit 1030, and it is determined whether or not the self-area coincides with the object existing within a predetermined distance from the self-location (the object is included in the self-area). When an object existing within a certain distance from the self-location does not coincide with the self-area, the warning display command is notified to the presentation unit 200. It should be noted that the presentation unit 200 is not limited to warning by an image, and various warning methods can be used as long as the method enables the user to recognize the warning, such as warning by voice.

Figure 11:
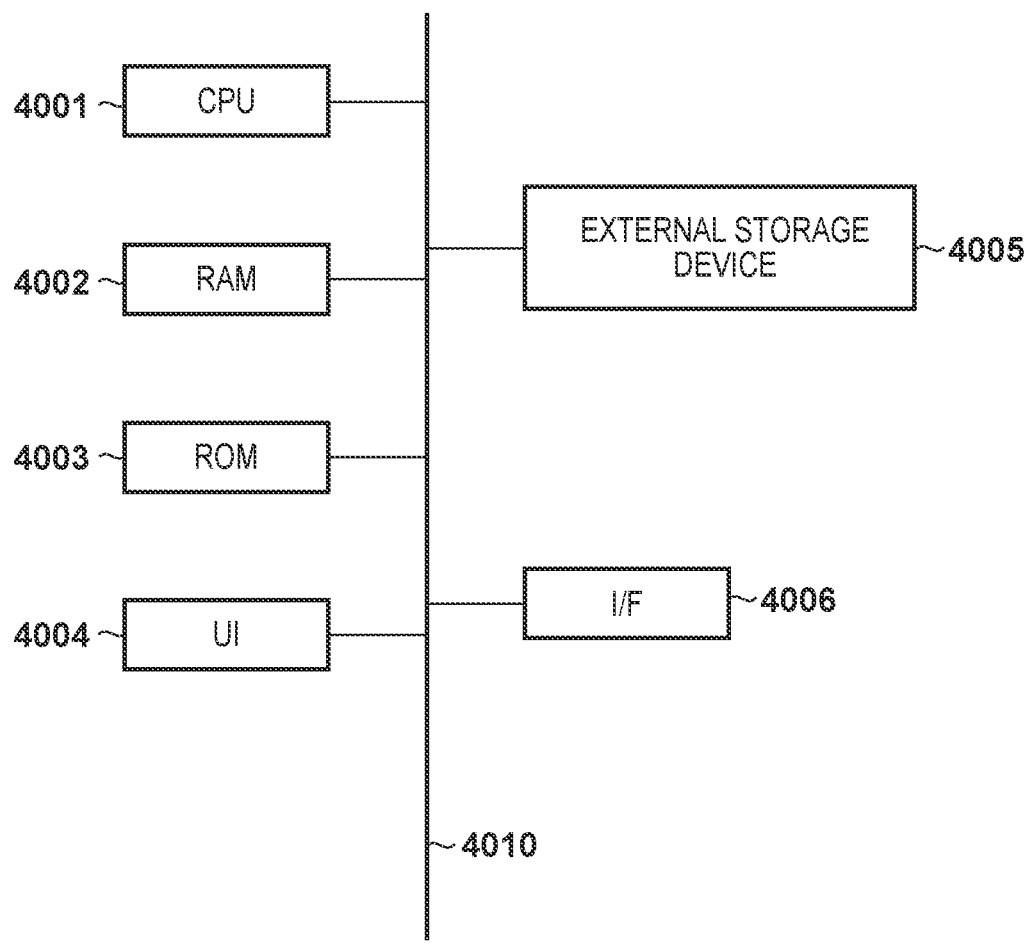
FIG. 11 is a block diagram illustrating a hardware configuration of an information processing apparatus.

FIG. 11 is a block diagram illustrating a hardware configuration of an information processing apparatus. The information processing apparatus includes a CPU 4001, a RAM 4002, a ROM 4003, a user interface (UI) 4004, an external storage device 4005, and an interface (I/F) 4006. The respective units are connected to each other via a bus 4010.

By reading and executing programs stored in the read-only memory (ROM) 4003 or the external storage device 4005, the CPU 4001 collectively controls the components connected via the buses 4010. Various programs and data for realizing the operating system (OS) and the processing described later are stored in ROM 4003 or the external storage device 4005. The CPU 4001 utilizes the random access memory (RAM) 4002 as a work memory when executing programs. The user interface (UI) 4004 accepts instruction inputs from the user. For example, it corresponds to a UI (keyboard, mouse, pen, touch panel, etc.) as a physical object, and various sensors for realizing a virtual UI. Further, the I/F 4006 is an interface for connecting to an external apparatus (such as the image capturing unit 100 and the presentation unit 200). Here, it is assumed that the processing described below is realized by software (the CPU 4001 executes a program), but some or all of the processing may be realized by hardware. An application specific integrated circuit (ASIC) and the like is used as the hardware.

<Operation of the Apparatus>

Figure 2:
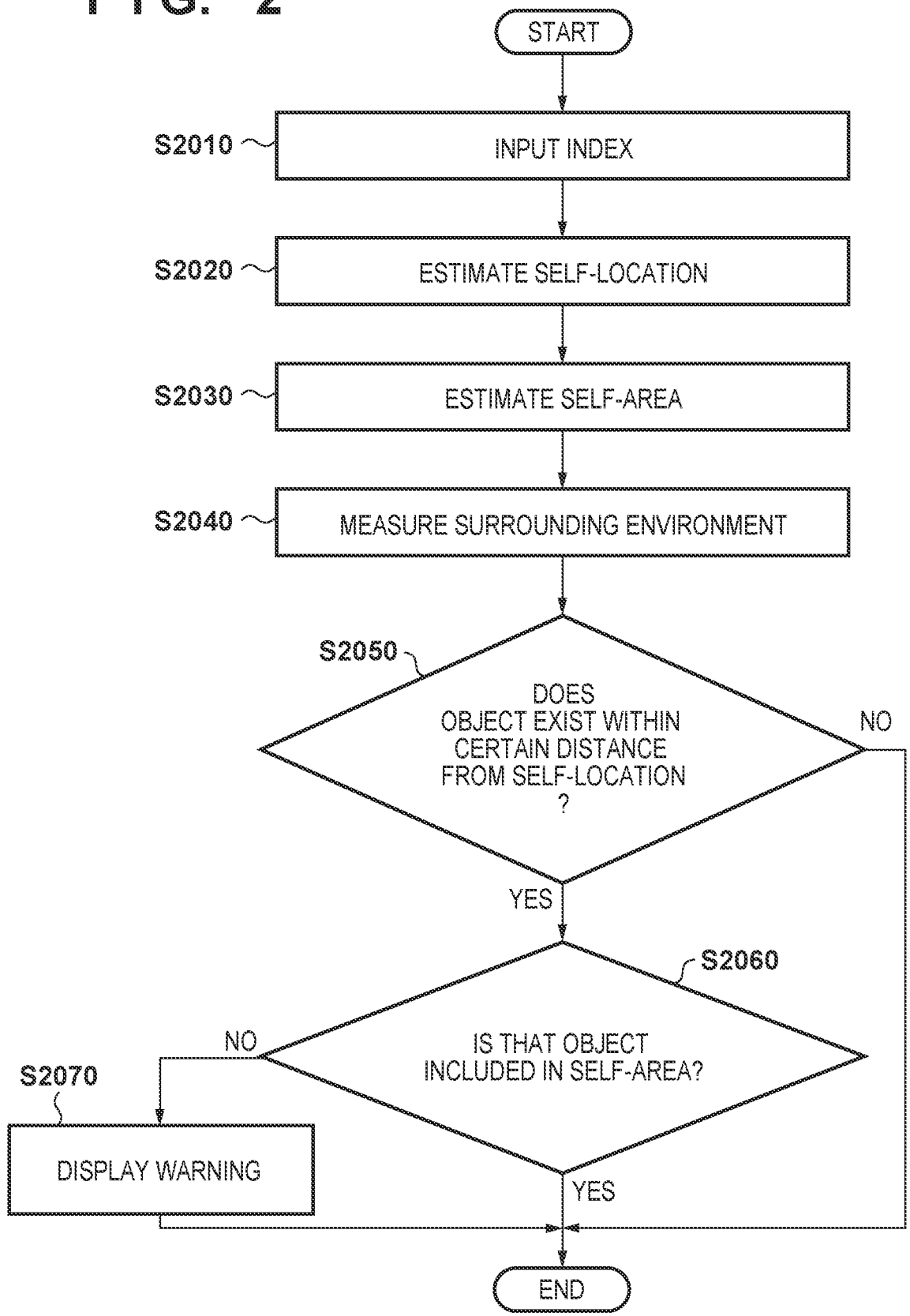
FIG. 2 is a flowchart illustrating a process in the first embodiment.

FIG. 2 is a flowchart illustrating a process in the first embodiment. A processing procedure of the information processing apparatus 1000 will be described.

In step S2010, the index determination unit 1020 receives from the user through the index registration unit 300 a registration of an index attached to the area to be determined as the self-area. The registered index is attached to an object that is the self-area (such as the object in the area 3420 of FIG. 12).

In step S2020, the self-location estimation unit 1010 acquires video from the image capturing unit 100, extracts feature points in the video, and estimates the self-location in the three-dimensional space. Here, the self-location can be obtained by SLAM estimation.

In step S2030, the self-area estimation unit 1030 acquires a location (or area) in the three-dimensional space of the index image as an index detection result from the index determination unit 1020. For example, the self-area estimation unit 1030 sets an area within a certain distance from the location (or area) of the acquired index image as the self-area.

In step S2040, the peripheral environment recognition unit 1040 acquires the depth of the peripheral environment and recognizes the presence of objects in the periphery. For example, the peripheral environment recognition unit 1040 acquires video from a plurality of viewpoints from the image capturing unit 100, measures the depth of the surrounding environment based on parallax, and estimates the presence of the object.

In step S2050, the warning display determination unit 1050 acquires a self-location from the self-location estimation unit 1010 and acquires an area of the measured object from the peripheral environment recognition unit 1040. The warning display determination unit 1050 calculates the location relationship between the acquired self-location and the area of an object (whether it is within a certain distance or not). If an object is present in the surrounding environment within a certain distance, the process proceeds to step S2060, and if not, the process ends.

In step S2060, the warning display determination unit 1050 acquires a self-area from the self-area estimation unit 1030 and calculates the location relationship between the self-location determined in step S2050 and the self-area. Then, it is determined whether or not the object decided in step S2050 is included in the self-area. If the object is contained in the self-area, the process is terminated; otherwise, the process proceeds to step S2070.

In step S2070, the warning display determination unit 1050 notifies a warning display to the presentation unit 200. As a result, the presentation unit 200 displays a warning.

For example, in the situation illustrated in FIG. 12, the peripheral environment recognition unit 1040 recognizes an object present in the area 3420 and the area 3440 as an object present in the surrounding environment based on the depth measured based on the video obtained by the image capturing unit 100. In particular, the area 3420 is recognized to be within a certain distance from the self-location 3410. On the other hand, the self-area estimation unit 1030 recognizes the area 3420 based on the detection result by the index determination unit 1020 as a self-area. Therefore, the warning display determination unit 1050 determines that the object existing in the area 3420 is an object included in the self-area, and determines that the warning display is not to be performed.

Figure 13:
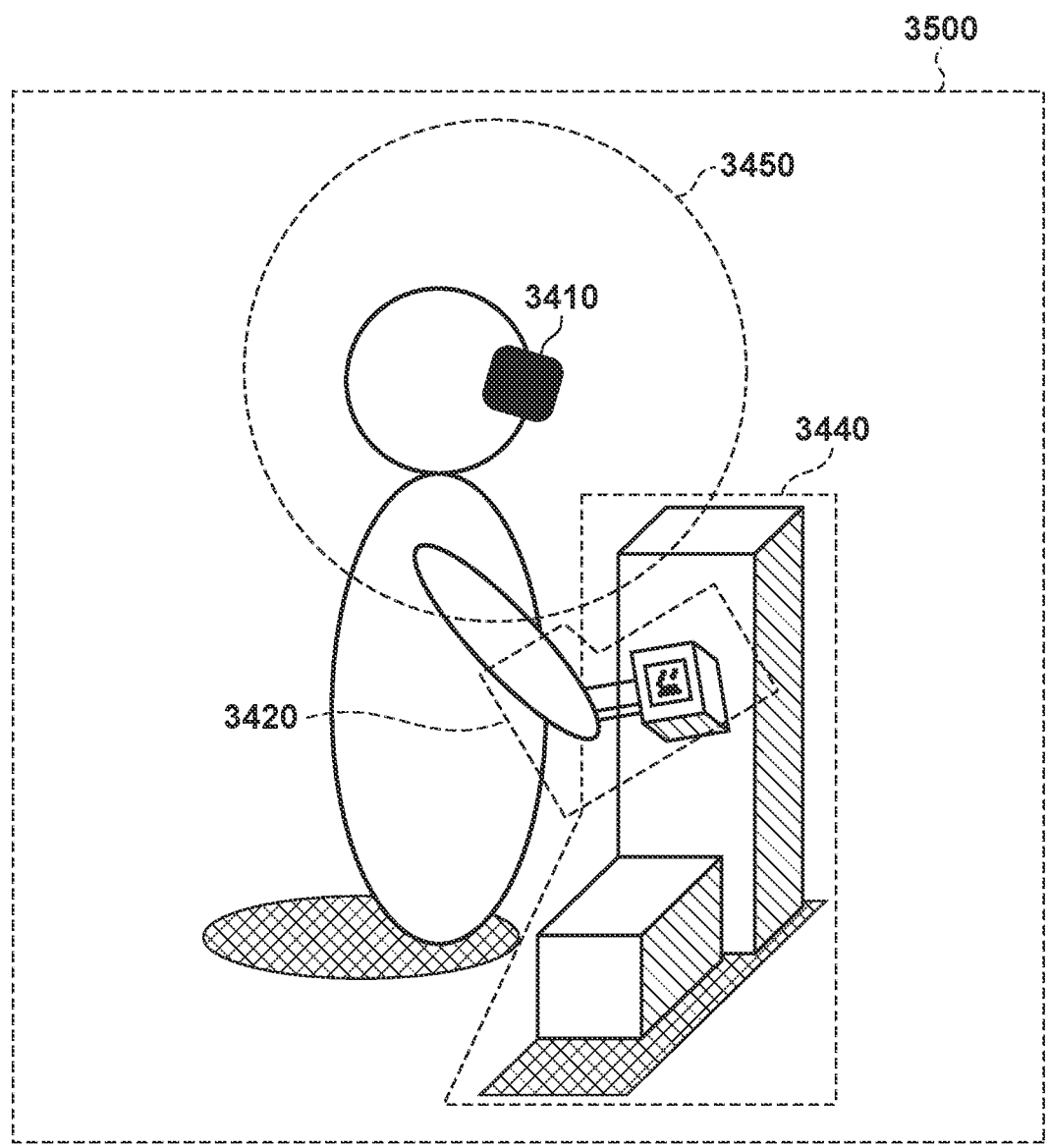
FIG. 13 is another diagram for explaining the relationship between the self-location, the self-area, and the surrounding environment.

FIG. 13 is another diagram for explaining the relationship between the self-location, the self-area, and the surrounding environment. For example, in the situation illustrated in FIG. 13, the peripheral environment recognition unit 1040 recognizes objects present in the area 3420 and the area 3440 as objects present in the surrounding environment based on the depths measured based on the video obtained by the image capturing unit 100. In particular, the area 3440 is recognized to be within a certain distance from the self-location 3410. On the other hand, the self-area estimation unit 1030 recognizes the area 3420 based on the detection result by the index determination unit 1020 as a self-area. Therefore, the warning display determination unit 1050 determines that the object existing in the area 3440 is an object not included in the self-area, and determines that the warning display is to be performed.

As described above, by virtue of the first embodiment, it is possible to suitably determine an object to be warned about as an obstacle among objects existing in the periphery by estimating the "self-area". As a result, a user experiencing mixed reality is enabled to better perceive the possibility of a collision with real world objects. In particular, it is possible to suitably issue a warning without registering an obstacle object in advance.

Second Embodiment

As a second embodiment of the image processing apparatus according to the present invention, an information processing system configured as a video see-through HMD will be described below as an example. This embodiment differs from the first embodiment in that a predetermined color is used for estimation of the self-area instead of the index image.

<System Configuration>

Figure 3:
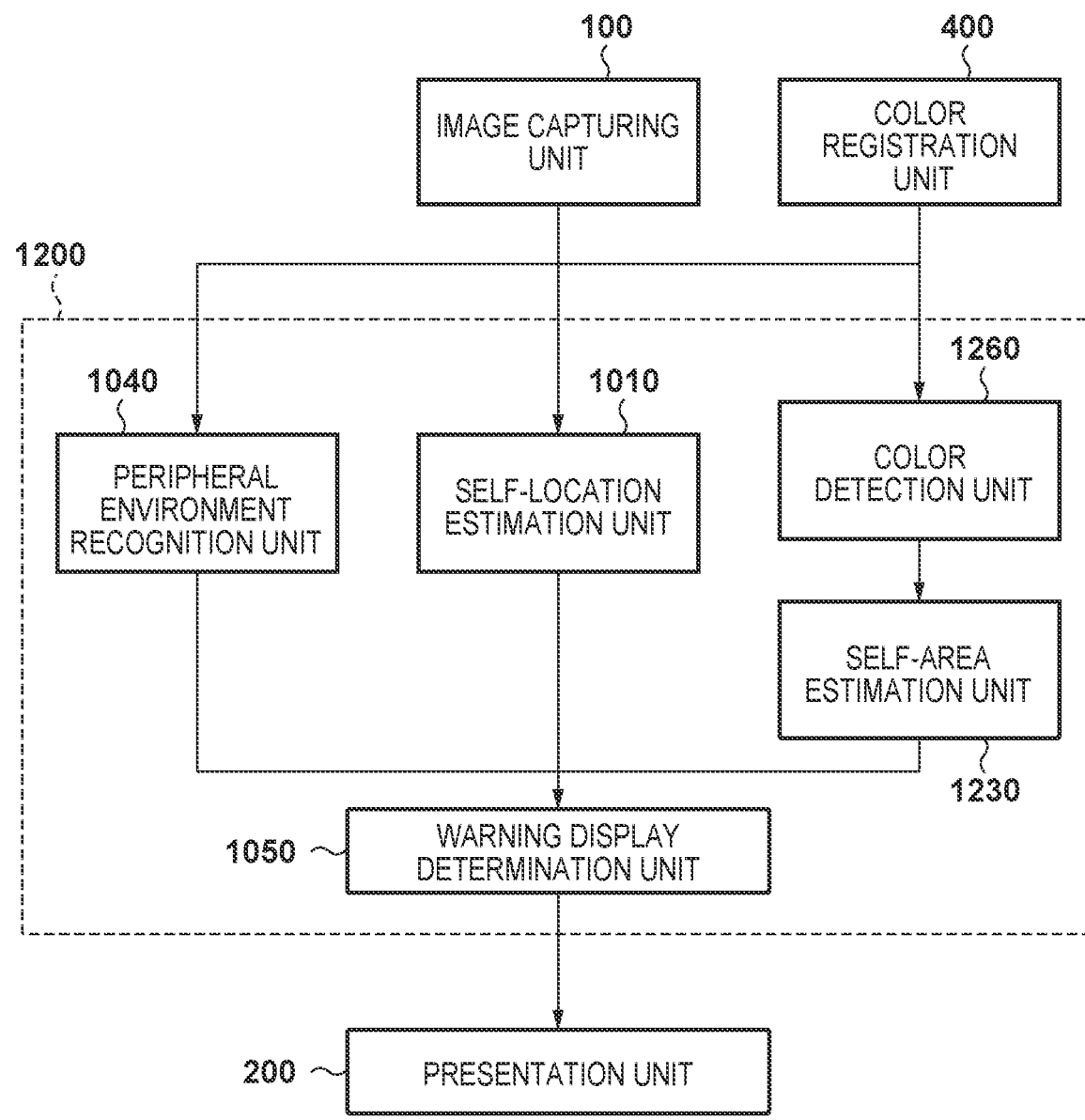
FIG. 3 is a block diagram illustrating a configuration of an information processing system according to a second embodiment.

FIG. 3 is a block diagram illustrating a configuration of an information processing system according to the second embodiment. Note that the processing units having the same reference numerals as those in the first embodiment are the same as those in the first embodiment, and therefore description thereof is omitted. As illustrated in FIG. 3, an information processing apparatus 1200 does not include the index registration unit 300 and the index determination unit 1020 in the first embodiment, but includes a color registration unit 400 and a color detection unit 1060.

The user or operator pre-registers a color indicating the self-area to the information processing apparatus 1200 through the color registration unit 400. For example, a color of the user's hand, foot, or the like is registered in advance, and the color detection unit 1260 is notified of the registered color.

The color detection unit 1260 acquires a video from the image capturing unit 100, detects an area of a registered color included in the acquired video, and notifies the self-area estimation unit 1030. Specifically, the color detection unit 1260 acquires the two-dimensional coordinates of the area of the registered color. Then, the color detection unit 1260 notifies the detected area to the self-area estimation unit 1230.

The self-area estimation unit 1230 estimates the self-area based on the color area acquired from the color detection unit 1260. Here the area that is treated as the self-area may be a color area on the two-dimensional image, it may be an area in three-dimensional space estimated from the parallax of the color area detected from a plurality of viewpoints.

<Operation of the Apparatus>

Figure 4:
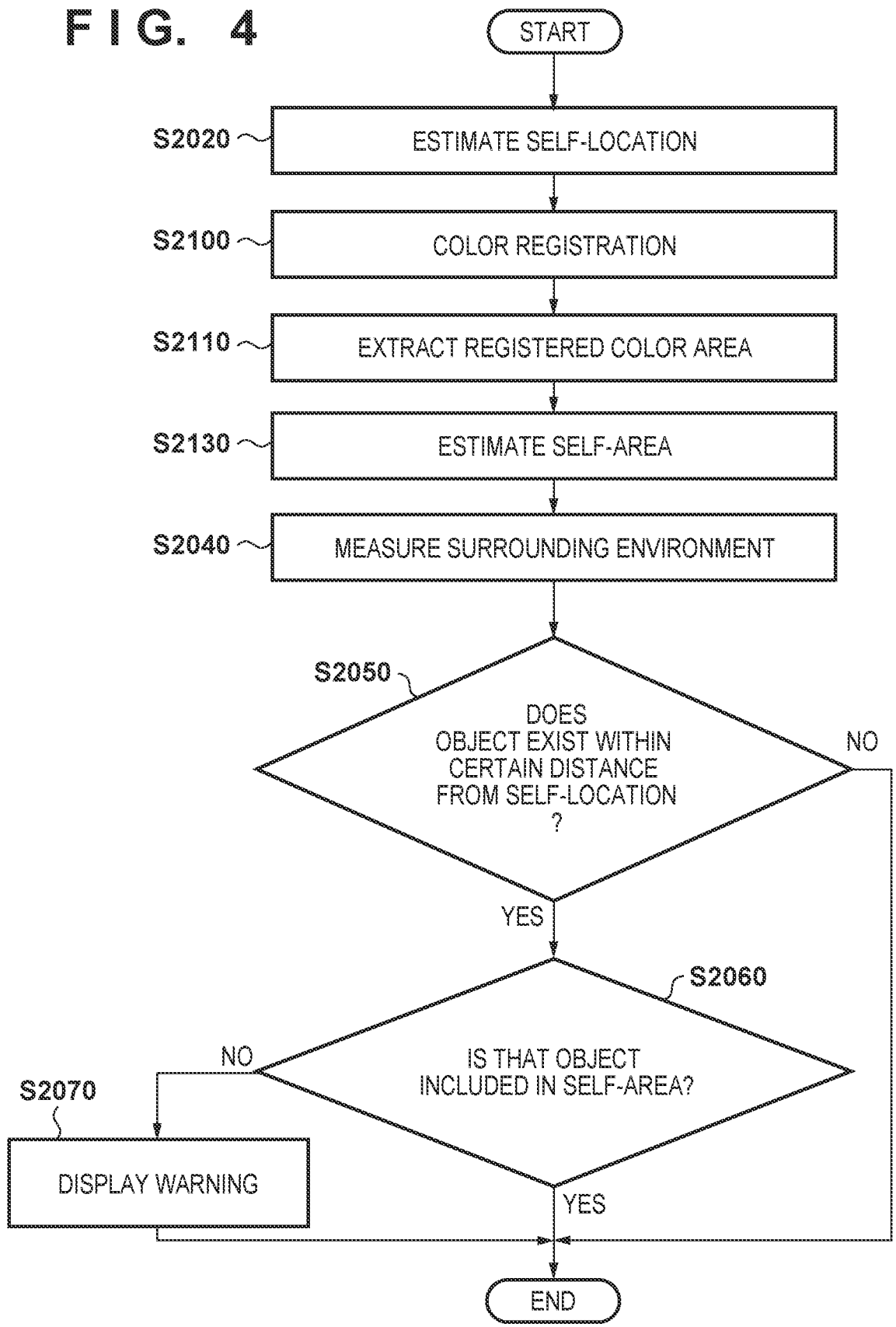
FIG. 4 is a flowchart illustrating a process in the second embodiment.

FIG. 4 is a flowchart illustrating a process in the second embodiment. Note that the steps having the same reference numerals as those in the first embodiment are the same as those in the first embodiment, and therefore description thereof is omitted.

In step S2100, the color detection unit 1260 receives from the user, through the color registration unit 400, a registration of a color of the area to be determined as the self-area. The registered color is a color of an object that is the self-area (such as the object in the area 3420 of FIG. 12, or a hand or arm or the like).

In step S2110, the color detection unit 1260 acquires video from the image capturing unit 100, and extracts an area of a registered color in the video.

In step S2130, the self-area estimation unit 1230 acquires the area extracted by the color detection unit 1260. Then, the self-area in the three-dimensional space is estimated based on the parallax information of the color area acquired from a plurality of viewpoints. For example, the self-area estimation unit 1230 sets an area within a certain distance from the acquired area as the self-area.

As described above, by virtue of the second embodiment, it is possible to suitably determine an object to be warned about as an obstacle among objects existing in the periphery by estimating the "self-area" based on color. In particular, it is possible to suitably determine a hand or an arm which is the self-area without attaching an index image to all areas which are desired to be the self-area.

Third Embodiment

As a third embodiment of the image processing apparatus according to the present invention, an information process-ing system configured as a video see-through HMD will be described below as an example. The present embodiment differs from the first and second embodiments in that the amount of movement of the depth (depth information) is used for estimation of the self-area.

<System Configuration>

Figure 5:
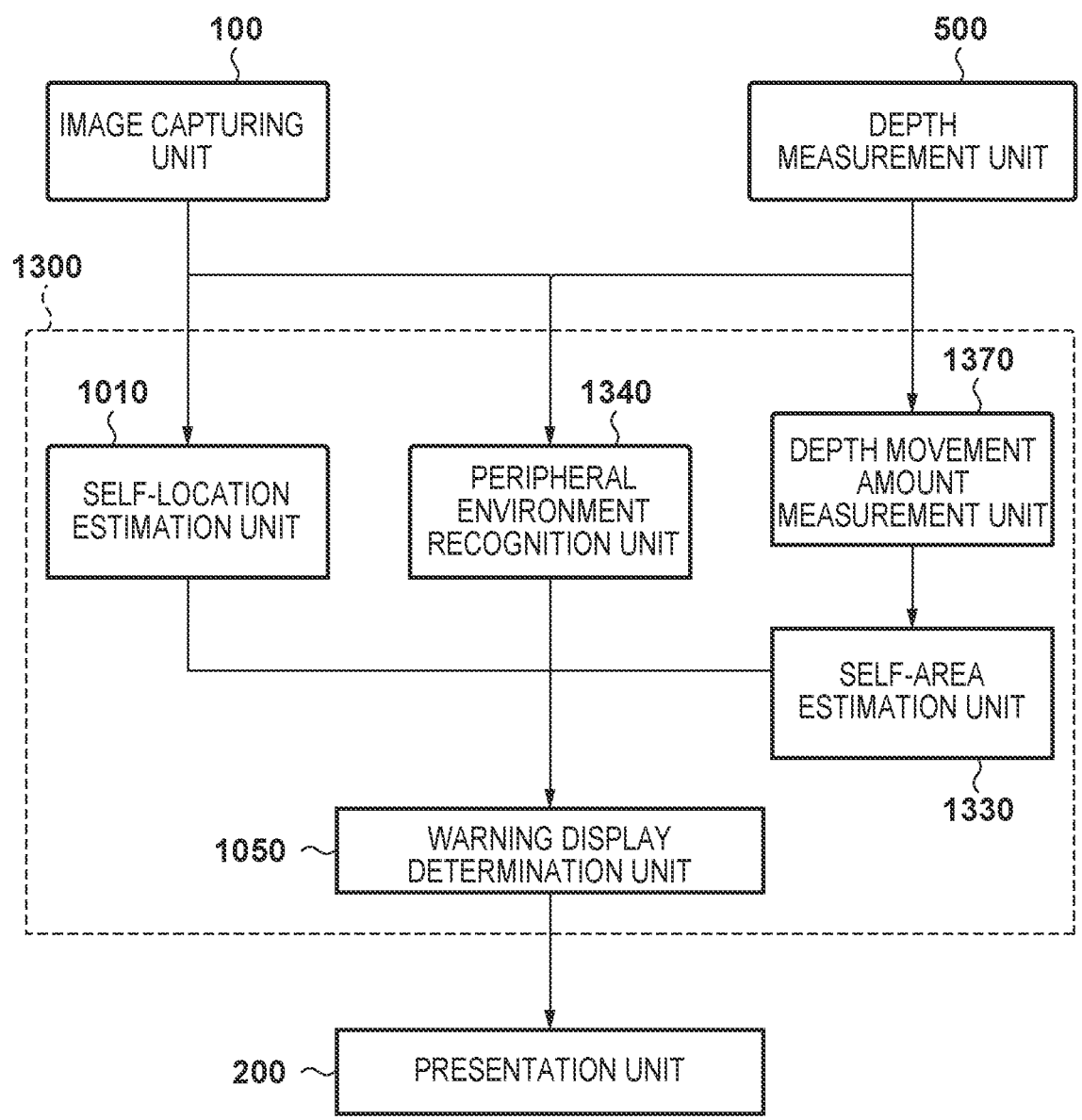
FIG. 5 is a block diagram illustrating a configuration of an information processing system according to a third embodiment.

FIG. 5 is a block diagram illustrating a configuration of an information processing system according to the third embodiment. Note that the processing units having the same reference numerals as those in the first embodiment are the same as those in the first embodiment, and therefore description thereof is omitted. As illustrated in FIG. 5, an information processing apparatus 1300 does not include the index registration unit 300 and the index determination unit 1020 in the first embodiment, but includes a depth measurement unit 500 and a depth movement amount measurement unit 1370.

The depth measurement unit 500 measures the distance from the HMD in the peripheral environment as the depth information, and the depth movement amount measurement unit 1370, notifies the peripheral environment recognition unit 1340.

The depth movement amount measurement unit 1070 sequentially acquires the depth from the depth measurement unit 500. Then, the depth movement amount measurement unit 1070 uses the depth of a plurality of points in time to measure a depth area movement feature at each point (each direction). Here, the depth movement amount measurement unit 1070 measures the depth movement amount, and notifies the self-area estimation unit 1330.

Further, the peripheral environment recognition unit 1340 measures an object in the surrounding environment based on the information of the depth notified from the depth measurement unit 500. Of course, the object may be measured based on the video from the image capturing unit 100 in the same manner as in the first embodiment, and the object may be measured based on both the video and depth.

<Operation of the Apparatus>

Figure 6:
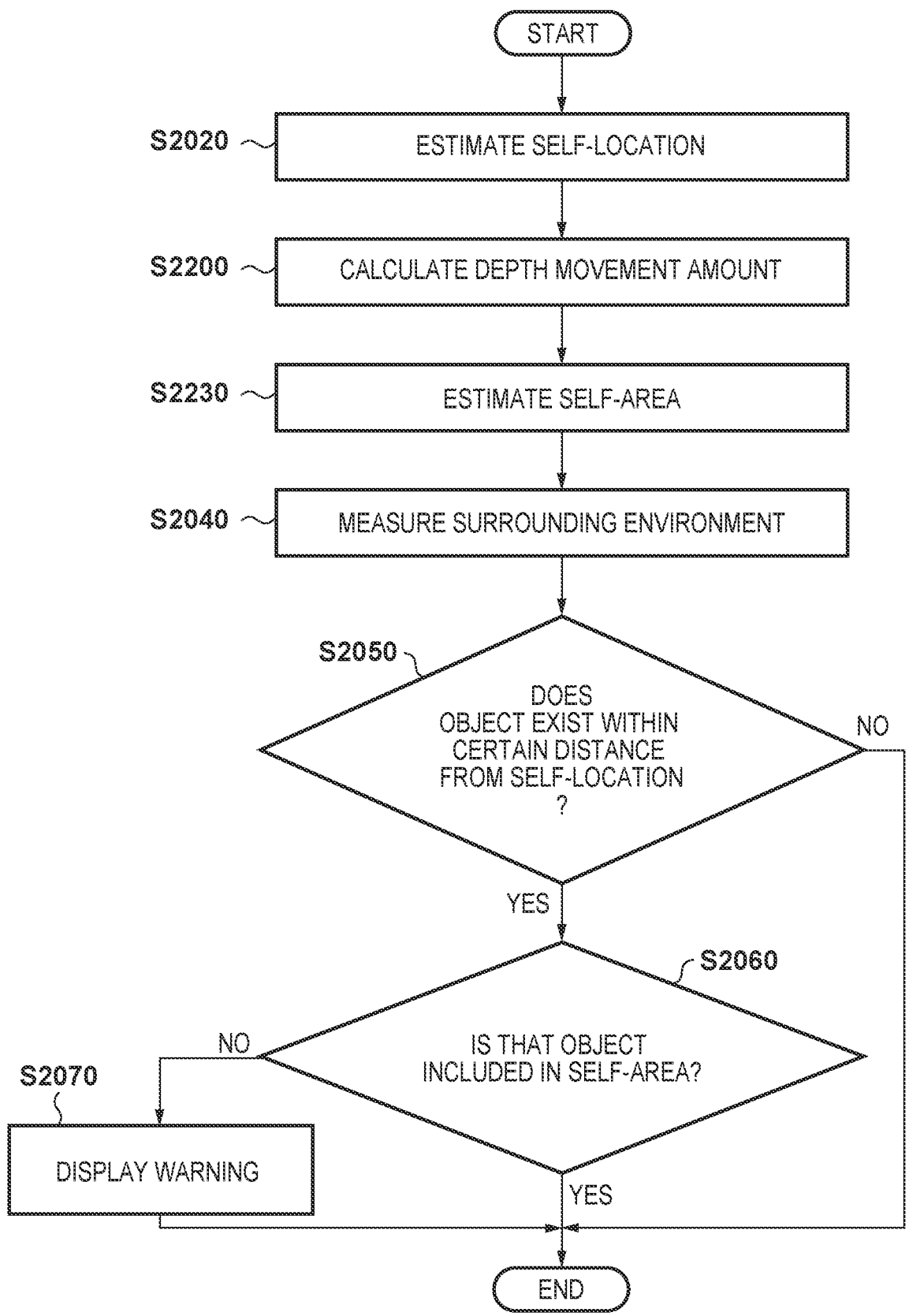
FIG. 6 is a flowchart illustrating a process in the third embodiment.

FIG. 6 is a flowchart illustrating a process in the third embodiment. Note that the steps having the same reference numerals as those in the first embodiment are the same as those in the first embodiment, and therefore description thereof is omitted.

In step S2200, the depth movement amount measurement unit 1370 acquires the sequential depth information from the depth measurement unit 500. For example, the depth movement amount measurement unit 1370 acquires depth information for the same field of view as the image capturing range of the image capturing unit 100. Then, the depth movement amount measurement unit 1370 compares the depths of each point within the field of view at a plurality of points, and measures a depth movement amount at each point in time.

In step S2230, the self-area estimation unit 1330 acquires the depth movement amount of each point from the depth movement amount measurement unit 1370. Then, by comparing the depth movement amount of each point for the field of view, the self-area estimation unit 1330 estimates the self-area and the surrounding environment within the field of view. For example, in the field of view, areas moving in the same direction and wider areas are defined as a peripheral environment, and areas moving in other directions are defined as the self-area.

Figure 9:
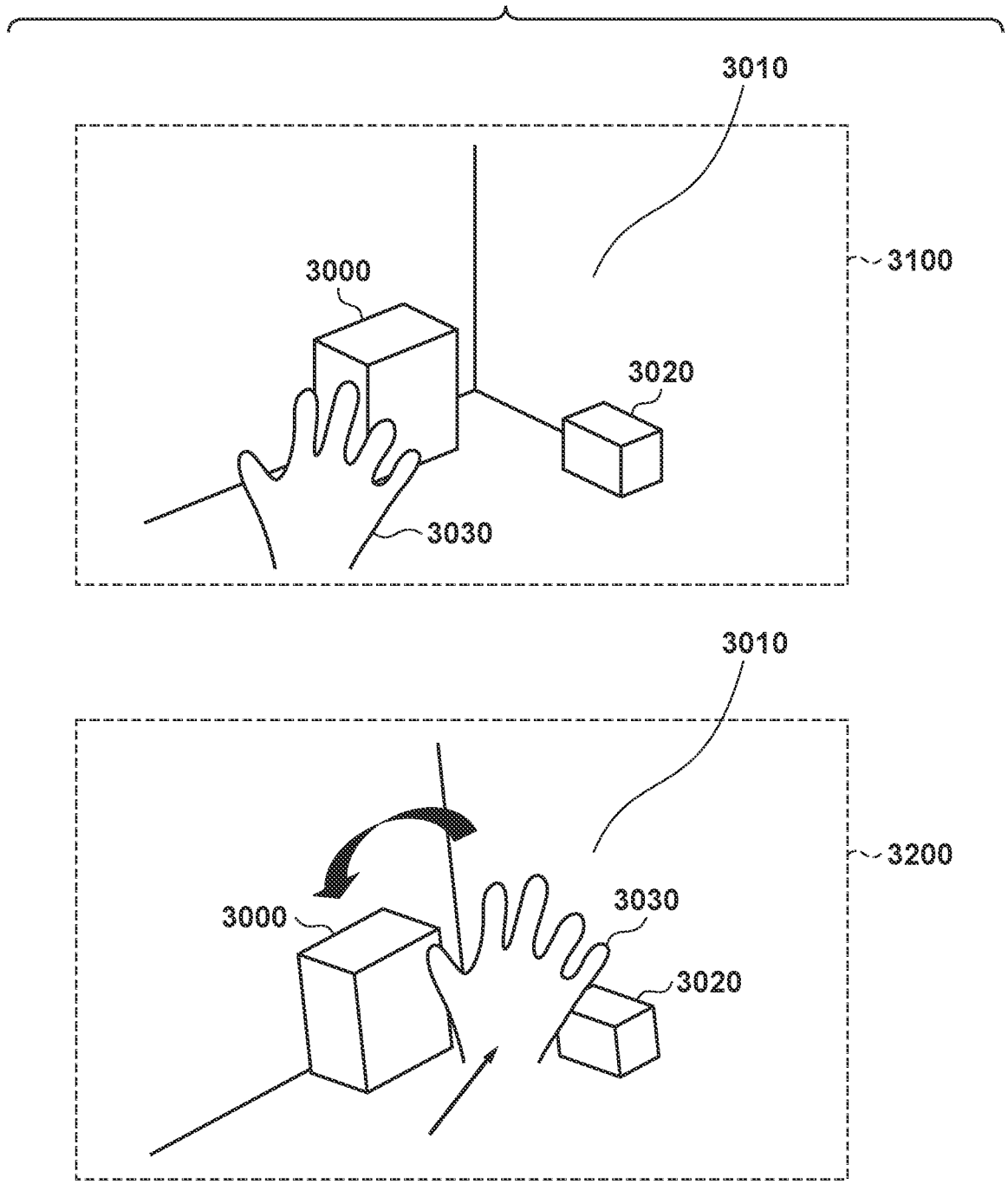
FIG. 9 is a diagram for explaining the estimation of the self-area.

FIG. 9 is a diagram for explaining the estimation of the self-area based on the depth movement amount. Here, a case will be described in which the environment 3100 changes to the environment 3200 as time elapses from one point in time to another point in time. In the environment 3100, there are a box 3000, a wall 3010, a box 3020, which are obstacle-areas, and a hand 3030, which is a self-area. In the environment 3200, the obstacle-areas and the self-area in the environment 3100 independently moved, as indicated by the arrow. For this reason, in this case, there is a division into a plurality of partial areas based on the depth movement amount. At this time, the box 3000, the wall 3010, and the box 3020 have the same moving direction (slightly counterclockwise rotation), and the hand 3030 has a different moving direction (translational movement to the upper right). Since the area corresponding to the box 3000, the wall 3010, and the box 3020 is larger than the area corresponding to the hand 3030, the area corresponding to the box 3000, the wall 3010, and the box 3020 is estimated as the surrounding environment. Then, the area corresponding to the hand 3030 which has a different moving direction is determined as the self-area.

As described above, by virtue of the third embodiment, it is possible to suitably determine an object to be warned about as an obstacle among objects existing in the periphery by estimating the "self-area" based on depth movement amount. In particular, it is possible to suitably determine the self-area without attaching an index image to all areas which are desired to be the self-area.

(First Variation)

It is also possible to replace the warning display determination unit 1050 with a warning display/CG display change unit (not illustrated).

The warning display/CG display change unit makes the warning display and the CG display translucent when an object in the surrounding environment which is within a certain distance from the self-location is included in the self-area. Here, the change of the warning display and the CG display is not limited to the change to the translucent display, and various changes such as a change of an icon of the warning display, a change of a size, a change of a transparency of the CG, a change of a color, a change of a wire frame display, a switch to non-display, and a blending of colors are possible.

Figure 14:
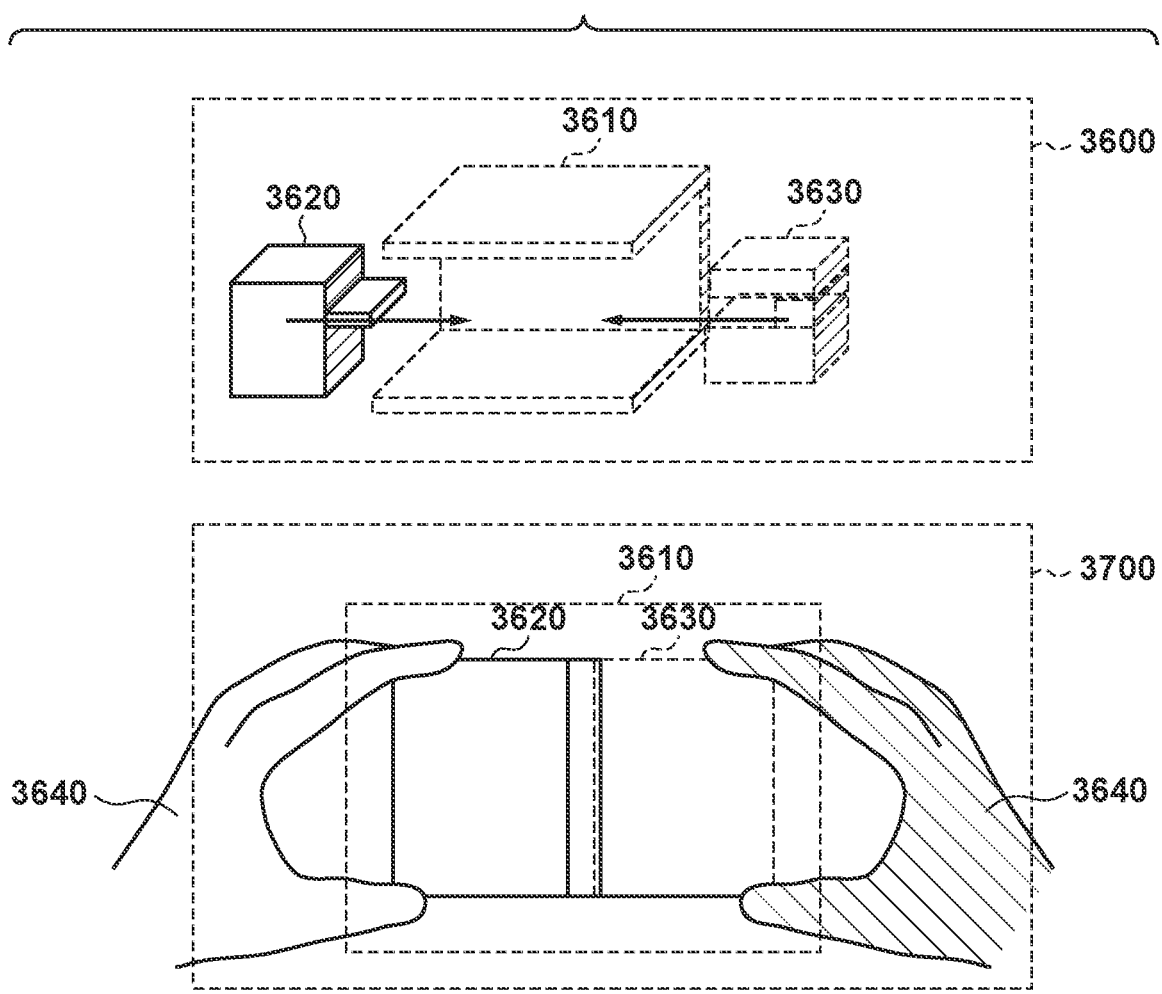
FIG. 14 is a diagram for illustratively describing the effect of the invention in a first modification.

FIG. 14 is a diagram for illustratively describing an effect of the invention in the first variation. Situation 3600 illustrates an MR experience environment as viewed from a particular direction and illustrates the work of combining a virtual object 3630 and a physical object 3620 with a virtual object 3610. In the situation 3600, the user is observing from the direction of an opening of the virtual object 3610 so that the virtual object 3630 and the physical object 3620 can be easily viewed.

Meanwhile, when this situation is viewed from another direction (above), the virtual object 3630 and the physical object 3620 cannot be visually observed. That is, since observation is from a direction other than the direction of the opening of the virtual object 3610, the field of view is blocked by the virtual object 3610. This makes it difficult for the user to continue perform work of assembling the virtual object 3630 and the physical object 3620 in relation to the virtual object 3610. Furthermore, since the location of the physical object 3620 cannot be confirmed, there is a possibility of an accidental collision (e.g., with the right hand not gripping the physical object 3620).

By applying the processing of the first variation, by making the display of the virtual object 3610 translucent, it becomes possible to continue the work while confirming where the hand 3640 and the physical object 3620 hidden by the virtual object 3610 are. On the other hand, it is possible to notify a warning about a wall or an obstacle in the periphery other than the self-area.

(Second Variation)

It is also possible to configure the self-area estimation unit 1330 in the configuration of the third embodiment (FIG. 5) to exclude objects that continue to approach for a certain period of time from the self-area.

Figure 10:
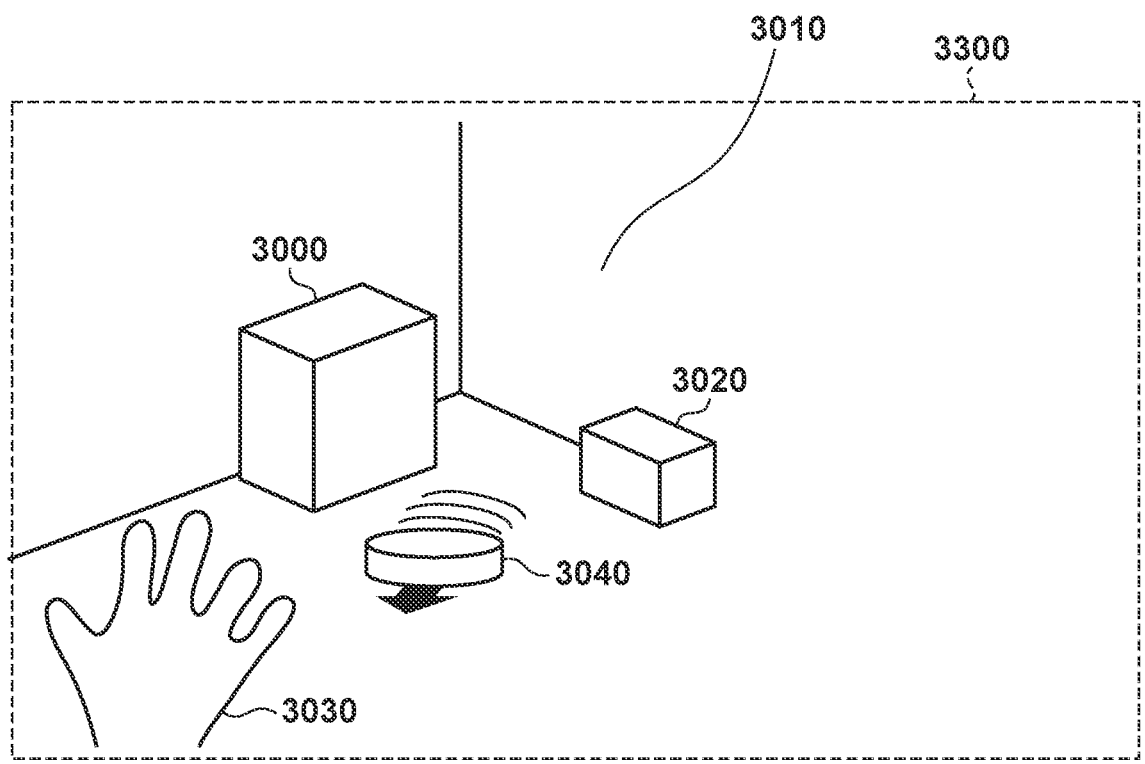
FIG. 10 is another diagram for explaining the estimation of the self-area.

FIG. 10 is another diagram for explaining the estimation of the self-area. In the environment 3300, there are a box 3000, a wall 3010, and a box 3020, which are obstacle-areas, and a hand 3030, which is a self-area. In addition, there is an obstacle 3040 that is a moving object.

Since the obstacle 3040 is a moving object, it has a different depth movement amount than the box 3000, the wall 3010, and the box 3020. However, if the obstacle 3040 continuously approaches in the direction of self, it may collide with the user. On the other hand, since the hand 3030 is a self-area, it does not continuously approach the user, but rather repeatedly approaches and moves away. In order to correctly notify the warning to the obstacle 3040 in such a situation, an object that continues to approach the self-location for a certain period of time is not regarded as a self-area even when its depth movement amount is different from the surrounding environment.

By applying the processing of the second variation, even when there is an obstacle that may move in the surrounding environment, a warning can be suitably displayed.

(Third Variation)

Processing opposite to the processing in step S2060 in the processing (FIG. 6) of the third embodiment may be performed. That is, the warning display determination unit 1050 may determine whether or not the object decided in step S2050 is included in the self-area, and proceed to step S2070 when the object is included in the self-area, and may end the process otherwise (not notify the display of the warning).

By applying the processing of the third variation, it becomes possible to display a warning only for the approach of the object with respect to the self-area. For example, when a user works while sitting at a verification desk in a space surrounded by a wall or the like, a warning can be more appropriately notified in an MR experience environment in which the relationship between the surrounding environment and the self-location is substantially fixed.

Fourth Variation

Figure 7:
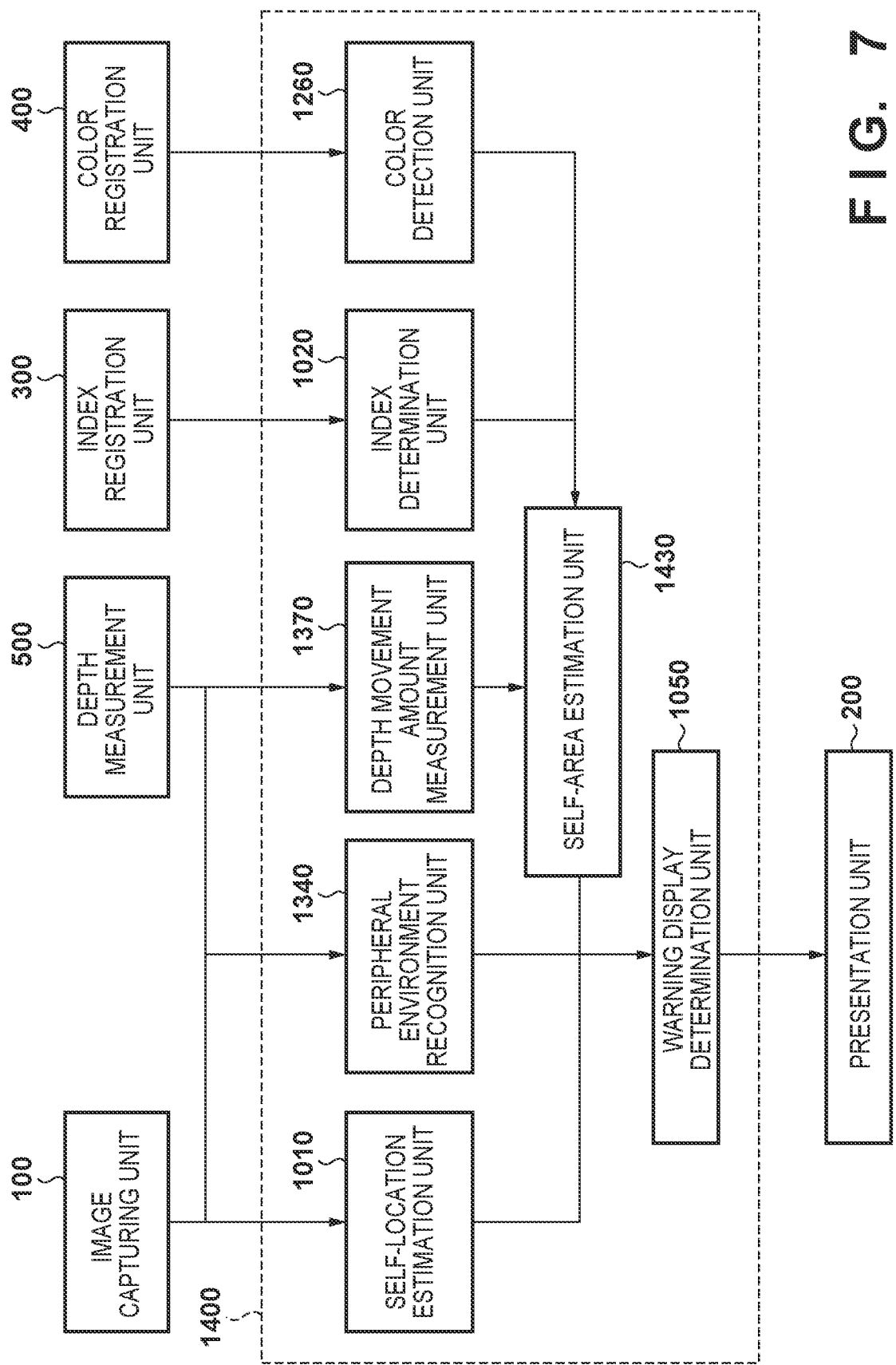
FIG. 7 is a block diagram illustrating a configuration of an information processing system according to a fourth modification.

The information processing system may be configured to include all the processing units illustrated in the first to third embodiments. FIG. 7 is a block diagram illustrating a configuration of an information processing system according to a fourth variation. An information processing apparatus 1400 includes an index registration unit 300, an index determination unit 1020, a color registration unit 400, a color detection unit 1260, a depth measurement unit 500, and a depth movement amount measurement unit 1370.

Figure 8:
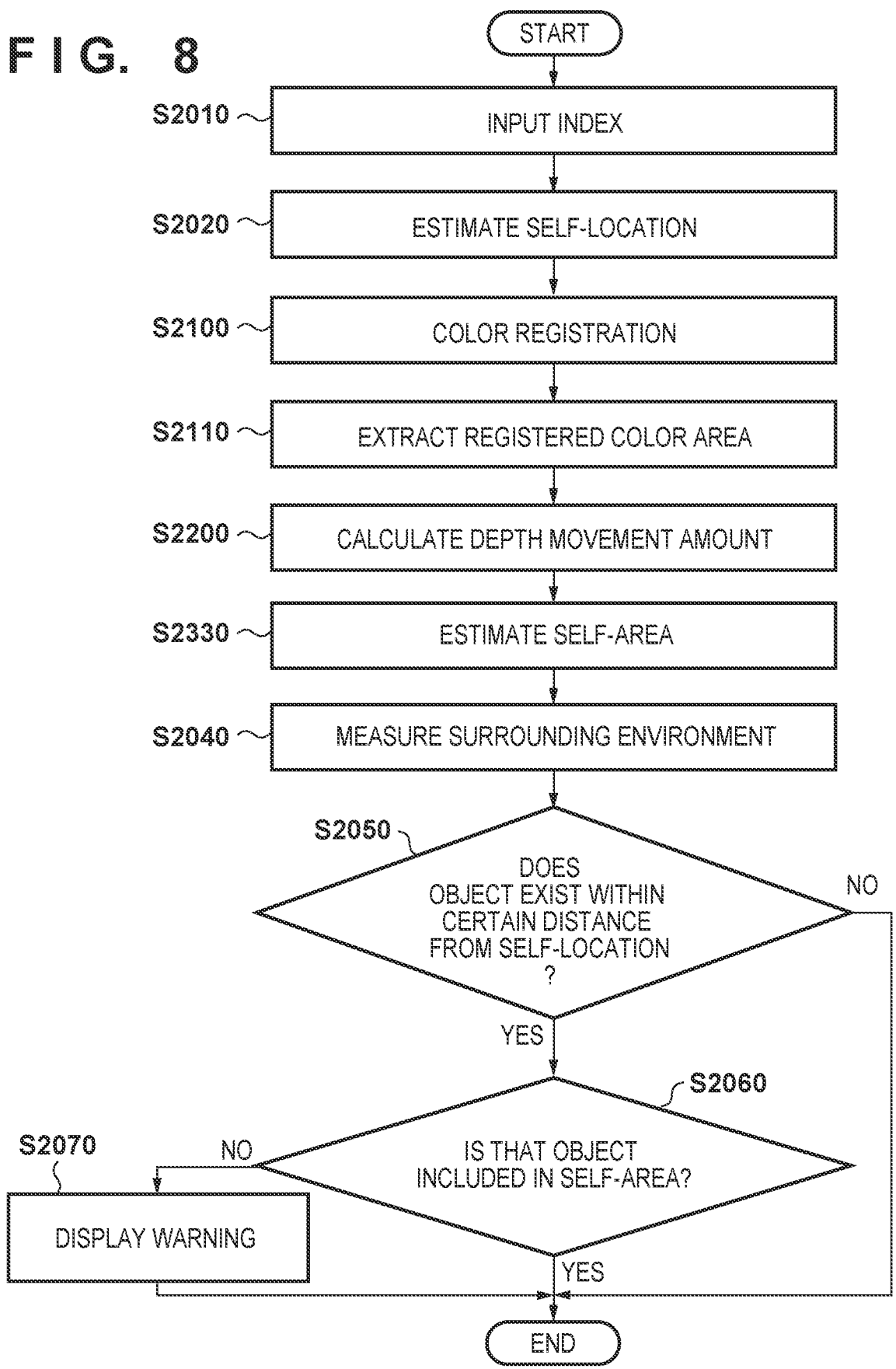
FIG. 8 is a flowchart illustrating a process in the fourth modification.

FIG. 8 is a flowchart illustrating a process in fourth variation. As illustrated in FIG. 8, step S2020, step S2100, step S2110, and step S2200 processes are arranged between step S2010 and step S2330 in the third embodiment.

In step S2330, the self-area estimation unit 1430 acquires the depth movement amount of each point from the depth movement amount measurement unit 1370. Then, by comparing the depth movement amount of each point for the field of view, the self-area estimation unit 1430 estimates the self-area and the surrounding environment within the field of view. For example, in the field of view, areas moving in the same direction and wider areas are defined as a peripheral environment, and areas moving in other directions are defined as the self-area. Furthermore, the self-area estimation unit 1430 modifies the self-area in consideration of the area of the index image in the video acquired from the index determination unit 1020 and the area of the registered color in the video acquired from the color detection unit 1060. For example, notification is made to the warning display determination unit 1050 where an area of the sum (AND) of the self-area estimated based on the depth movement amount, an area of the index image, an area of the registered color is made to be the modified self-area. It should be noted that any combination of two of these three types of areas may be used. Instead of the sum (AND), a product (OR) or an XOR may be used.

By applying the processing of the fourth variation, it is possible to increase the accuracy of detection of the self-area in a variety of situations.

Fourth Embodiment

As a fourth embodiment of the image processing apparatus according to the present invention, an information processing system configured as a video see-through HMD will be described below as an example. Unlike the first to third embodiments, the movement history of the self-location is used for estimation of the self-area.

<System Configuration>

FIG. 15 is a block diagram illustrating a configuration of an information processing system according to a fourth embodiment. Note that the processing units having the same reference numerals as those in the first embodiment are the same as those in the first embodiment, and therefore description thereof is omitted. As illustrated in FIG. 15, an information processing apparatus 1500 does not include the index registration unit 300 and the index determination unit 1020 in the first embodiment, but includes a self-location storage unit 1580.

The self-location storage unit 1080 sequentially acquires the self-location estimated by the self-location estimation unit 1010, and holds the self-location for a certain period of time in a time series. A self-area estimation unit 1240 estimates the self-area based on the time series of the self-location held in the self-location storage unit 1080.

<Operation of the Apparatus>

In the processing sequence of the information processing apparatus 1400, the inputting (step S2010) of the index in the first embodiment (FIG. 2) is deleted. In the estimation (step S2030) of the self-area, the self-location is estimated based on the history of the self-location in the estimation (step S2020) of the self-location.

For example, a history of the self-location for the last 10 minutes is received, and the posture is averaged. The downward direction of the obtained posture is estimated to be vertically downward. Also, an area in which a cylinder of a predetermined radius (e.g., 50 cm) that extends vertically downward from the latest (current) self-location is assumed to be the self-area. For example, the cylinder extends until the y coordinate of the world coordinates becomes 0. Here, it is also possible to use other methods, such as a method of estimating the user's own area from the self-location and a human posture DB, as illustrated in Japanese Patent Laid-Open No. 2017-156887.

As described above, by virtue of the fourth embodiment, it is possible to suitably determine an object to be warned about as an obstacle among objects existing in the periphery by estimating the "self-area" based on the self-location movement history. With such a configuration, it is possible to reduce the number of external devices (the index registration unit 300, the color registration unit, and the depth measurement unit 500).

Other Embodiments

Note that the respective processing units in the above-described information processing apparatus can be configured to perform the processing using instead a trained model trained by machine learning. That is, this can be applied to the image processing in the self-location estimation unit 1010, the index determination unit 1020, the peripheral environment recognition unit 1040, the color detection unit 1060, the peripheral environment recognition unit 1340, the depth movement amount measurement unit 1370. Further, this can be applied to the area estimation in the self-area estimation units 1030, 1230, 1330, 1430, and 1530. Furthermore, it can be applied to the determination in the warning display determination unit 1050. In this case, for example, a plurality of combinations of input data and output data for the processing unit are prepared as learning data, knowledge is acquired from them by machine learning, and a learned model for outputting output data for the input data as a result based on the acquired knowledge is generated. The learned model may be, for example, a neural network model. The learned model then performs processing of the processing unit by operating in cooperation with a CPU, a GPU, or the like as a program for performing processing equivalent to that of the processing unit. The learned model may be updated after a certain process, as necessary.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-116628, filed Jun. 24, 2019, which is hereby incorporated by reference herein in its entirety.

What is claimed is:

1. An image processing apparatus comprising:
   a memory storing instructions; and
   a processor that implements the instructions to:
   estimate, based on a video obtained by a video camera that captures a physical space, a self-location of the video camera in the physical space;
   recognize a physical object existing within a certain distance from the self-location of the video camera based on the video;
   acquire a depth of each point in the video;
   determine a predetermined area in the physical space in relation to the video based on a movement feature of the acquired depth area of each point in the video; and
   determine whether or not to issue a warning in accordance with whether or not the recognized physical object is included in the determined predetermined area.

2. The image processing apparatus according to claim 1, wherein the processor further determines the predetermined area based on a predetermined image feature included in the video.

3. The image processing apparatus according to claim 2, wherein:
   the predetermined image feature is a given index image, and
   the determined predetermined area includes a physical object to which the given index image is attached.

4. The image processing apparatus according to claim 3, further comprising:
   a terminal that accepts registration of the given index image,
   wherein the processor implements the instructions to detect the given index image included in the video.

5. The image processing apparatus according to claim 2, wherein:
   the predetermined image feature is a given color included in the video, and
   the determined predetermined area includes a physical object having the given color.

6. The image processing apparatus according to claim 5, further comprising:
   a color registration device that accepts registration of the given color included in the video,
   wherein the processor implements the instructions to detect the given color included in the video.

7. The image processing apparatus according to claim 1, wherein:
   the processor implements the instructions to divide the video into a plurality of partial areas based on the movement feature of the acquired depth area of each point in the video, and
   the processor determines the predetermined area based on one or more partial areas, excluding a widest partial area, among the plurality of partial areas.

8. The image processing apparatus according to claim 1, wherein the determined predetermined area excludes a range in which a physical object that continues to approach the video camera for a predetermined period of time appearing in the video, based on the movement feature of the acquired depth area of each point in the video.

9. The image processing apparatus according to claim 1, wherein the processor further determines the predetermined area in the physical space based on a history of the estimated self-location of the video camera.

10. The image processing apparatus according to claim 9, wherein the processor estimates the self-location of the video camera, by determining a vertically downward direction in the physical space based on the history, as an area where a cylinder of a predetermined radius from a latest estimated self-location of the video camera extends in the vertically downward direction.

11. The image processing apparatus according to claim 1, wherein in a state where the recognized physical object is not included in the determined predetermined area, the processor determines to issue a warning.

12. The image processing apparatus according to claim 1, wherein the warning includes at least one of a warning display on the display unit or a warning sound reproducible in a sound reproduction device.

13. The image processing apparatus according to claim 1, wherein the video camera and the image processing apparatus are configured as part of a video see-through type head-mounted display.

14. The image processing apparatus according to claim 13, wherein the predetermined area indicates an area where at least a part of a body of a user wearing head-mounted display is estimated to exist in the video.

15. The image processing apparatus according to claim 13, wherein the predetermined area is an area where a physical object moving in synchronism with a movement of a user wearing a head-mounted display is estimated to exist in the video.

16. The image processing apparatus according to claim 15, wherein the physical object that moves in synchronism with the movement of the user is an object that the user holds in his hand and moves.

17. A method of controlling an image processing apparatus, the method comprising:
   estimating, based on a video obtained by a video camera that captures a physical space, a self-location of the video camera in the physical space;
   recognizing a physical object existing within a certain distance from the self-location of the video camera based on the video;
   acquiring a depth of each point in the video;
   determining a predetermined area in the physical space in relation to the video based on a movement feature of the acquired depth area of each point in the video; and
   determining whether or not to issue a warning in accordance with whether or not the recognized physical object is included in the determined predetermined area.

18. A non-transitory computer-readable medium storing a program executable by a computer to of an image processing apparatus to execute a method comprising:
   estimating, based on a video obtained by a video camera that captures a physical space, a self-location of the video camera in the physical space;
   recognizing a physical object existing within a certain distance from the self-location of the video camera based on the video;
   determining a predetermined area in the physical space in relation to the video based on a movement feature of the acquired depth area of each point in the video; and
   determining whether or not to issue a warning in accordance with whether or not the recognized physical object is included in the determined predetermined area.

* * * * *